United States Patent
Baeyens et al.

(10) Patent No.: US 8,423,955 B2
(45) Date of Patent: Apr. 16, 2013

(54) METHOD AND APPARATUS FOR SUPPORTING MULTIPLE BUSINESS PROCESS LANGUAGES IN BPM

(75) Inventors: Tom Baeyens, Oud-Turnhout (BE); Alejandro Guizar, Houston, TX (US)

(73) Assignee: Red Hat, Inc., Raleigh, NC (US)

( * ) Notice: Subject to any disclaimer, the term of this patent is extended or adjusted under 35 U.S.C. 154(b) by 1063 days.

(21) Appl. No.: 11/897,910

(22) Filed: Aug. 31, 2007

(65) Prior Publication Data

US 2009/0064104 A1    Mar. 5, 2009

(51) Int. Cl.
G06F 9/44 (2006.01)
(52) U.S. Cl.
USPC .......................................................... 717/114
(58) Field of Classification Search ........................ None
See application file for complete search history.

(56) References Cited

U.S. PATENT DOCUMENTS

| | | | |
|---|---|---|---|
| 5,809,297 A | 9/1998 | Kroenke et al. |
| 7,069,553 B2 | 6/2006 | Narayanaswamy et al. |
| 7,131,123 B2 | 10/2006 | Suorsa et al. |
| 7,151,744 B2 | 12/2006 | Sarkinen et al. |
| 7,231,267 B2 | 6/2007 | Boumas et al. |
| 7,284,039 B2 | 10/2007 | Berkland et al. |
| 7,290,258 B2 | 10/2007 | Steeb et al. |
| 7,322,031 B2 | 1/2008 | Davis et al. |
| 7,454,492 B2 | 11/2008 | Bauer et al. |
| 7,487,513 B1 | 2/2009 | Savchenko et al. |
| 7,519,972 B2 | 4/2009 | Carr et al. |
| 7,577,964 B2 | 8/2009 | Beringer et al. |
| 7,647,392 B2 | 1/2010 | Sharma et al. |
| 7,665,085 B2 | 2/2010 | Sundararajan et al. |
| 7,694,140 B1 | 4/2010 | Sachenko et al. |
| 7,770,151 B2 | 8/2010 | Sanjar et al. |
| 7,822,826 B1 | 10/2010 | Savchenko et al. |
| 7,822,860 B2 | 10/2010 | Brown et al. |
| 7,836,441 B2 | 11/2010 | Chen et al. |
| 7,856,631 B2 | 12/2010 | Brodkorb et al. |
| 7,861,243 B2 | 12/2010 | Narayanaswamy et al. |
| 7,908,294 B2 | 3/2011 | Ansari |
| 2002/0178254 A1 | 11/2002 | Brittenham et al. |
| 2002/0178394 A1 | 11/2002 | Bamberger et al. |
| 2003/0050392 A1 | 3/2003 | Pace et al. |
| 2003/0078934 A1 | 4/2003 | Cappellucci et al. |
| 2003/0225757 A1 | 12/2003 | Evans et al. |
| 2004/0034669 A1 | 2/2004 | Smith et al. |
| 2004/0039748 A1 | 2/2004 | Jordan, II et al. |
| 2004/0098311 A1* | 5/2004 | Nair et al. ........................ 705/26 |
| 2004/0128622 A1 | 7/2004 | Mountain et al. |
| 2004/0133876 A1 | 7/2004 | Sproule |
| 2004/0177335 A1 | 9/2004 | Beisiegel et al. |

(Continued)

OTHER PUBLICATIONS

"Jbpm-bpel-1.0-alpha1," jBPM.org Files on SourceForge.net, Jun. 1, 2005. 44 pages.

(Continued)

*Primary Examiner* — Philip Wang
(74) *Attorney, Agent, or Firm* — Lowenstein Sandler LLP

(57) ABSTRACT

A method and apparatus for supporting multiple business process languages in business process management (BPM). The method may include receiving user input identifying a definition of a business process, and determining which business process language was used for the definition of the business process. The method further includes invoking a runtime environment associated with the used business process language, and executing the business process in the invoked runtime environment.

20 Claims, 9 Drawing Sheets

U.S. PATENT DOCUMENTS

| | | | |
|---|---|---|---|
| 2004/0177352 | A1 | 9/2004 | Narayanaswamy et al. |
| 2005/0010456 | A1* | 1/2005 | Chang et al. ............... 705/7 |
| 2005/0071243 | A1* | 3/2005 | Somasekaran et al. ......... 705/26 |
| 2005/0114771 | A1* | 5/2005 | Piehler et al. ............... 715/536 |
| 2005/0165932 | A1 | 7/2005 | Banerjee et al. |
| 2005/0204354 | A1 | 9/2005 | Sundararajan et al. |
| 2005/0251468 | A1 | 11/2005 | Eder |
| 2005/0283837 | A1 | 12/2005 | Olivier et al. |
| 2006/0004783 | A1 | 1/2006 | Carr et al. |
| 2007/0011322 | A1 | 1/2007 | Moiso |
| 2007/0219971 | A1 | 9/2007 | Biermann et al. |
| 2007/0226196 | A1 | 9/2007 | Adya et al. |
| 2007/0226233 | A1 | 9/2007 | Walter et al. |
| 2007/0240127 | A1 | 10/2007 | Roques et al. |
| 2007/0250575 | A1 | 10/2007 | Tseitlin et al. |
| 2007/0260629 | A1 | 11/2007 | Tseitlin et al. |
| 2007/0280111 | A1 | 12/2007 | Lund |
| 2008/0235682 | A1* | 9/2008 | Oren et al. ............... 718/100 |
| 2008/0320486 | A1* | 12/2008 | Bose et al. ............... 718/105 |
| 2009/0183150 | A1 | 7/2009 | Felts |

OTHER PUBLICATIONS

"Jbpm-bpel-1.0-alpha2," jBPM.org Files on SourceForge.net, Jun. 24, 2005, 41 pages.

"Jbpm-bpel-1.0-alpha3," jBPM.org Files on SourceForge.net, Sep. 6, 2005, 51 pages.

"Jbpm-bpel-1.0-alpha4," jBPM.org Files on SourceForge.net, Dec. 26, 2005, 55 pages.

"Jbpm-bpel-1.1-beta1," jBPM.org Files on SourceForge.net, Jun. 11, 2006, 58 pages.

Apte, Ajay "IBM WebSphere Developer Technical Journal: System Administration for WebSphere Application Server V5, Part 6—Application Management," Sep. 10, 2003, 8 pages.

Baeyens, Tom, "The State of Workflow," Jboss, May 28, 2007, 14 pages. http://www.ibm.com/developerworks/websphere/techjournal/0309_apte/apte.html.

Koenig, John, Jboss jBPM, White Paper, Nov. 2004, 10 pages.

IBM Websphere Application Server 5.1 Documentation, "Develop Web service deployment descriptor templates from the WSDL file", Version 5, Release 3, Oct. 4, 2005. publib.boulder.ibm.com/infocenter/iseries/v5r3/index.jsp?topic=%2Frzatz%2Fwebserv%2Fwsdevddtemp.htm.

IBM Websphere 6 Documentation, "WebSphere MQ custom properties" Sep. 2, 2006. publib.boulder.ibm.com/infocenter/wasinfo/v6r1/index.jsp?topic%2Fcom.ibm.websphere.base.doc%2Finfo%2Faes%2Fcmm_customprops.html.

IBM WebSphere 6 Documentation, "Publish/subscribe messaging example using remote publication points," Oct. 5, 2005. publib.boulder.ibm.com/infocenter/dmndhelp/v6rxmx/index.jsp?topic=/com.ibm.websphere.pmc.nd.doc/concepts/cjo_remote_pubsub.html.

Websphere Message Broker Manual, publib.boulder.ibm.com/infocenter/wmbhelp/v6r0m0/index.jsp, Sep. 30, 2005.

Sun Microsystems, "Java2 Enterprise Edition Deployment API 1.1", 2002; [retrieved on Oct. 17, 2011]; Retrived from Internet <URL:http://java.sun.com/com/2ee/tools/deployment/88ChangeLog1/1-aug2802.html.;pp. 1-10.

Bea Systems, Inc. "Deploying WebLogic Platform Applications, Version 8.1 Service Pack 6", Jun. 2006. [retrieved on May 25, 2011]. Retrieved from Internet,URL:http://download.oracle.com/docs/cdE13196_01/platform/docs81/pdf/deploy.pdf>; pp. 1-172.

Red Hat Office Action for U.S. Appl. No. 11/900,707, mailed Nov. 9, 2011.

Red Hat Office Action for U.S. Appl. No. 11/900,740, mailed May 9, 2011.

Red Hat Office Action for U.S. Appl. No. 11/900,740, mailed Sep. 27, 2011.

Red Hat Office Action for U.S. Appl. No. 11/998,508, mailed Sep. 8, 2011.

Red Hat Office Action for U.S. Appl. No. 11/998,508, mailed Jan. 13, 2012.

Red Hat Office Action for U.S. Appl. No. 11/897,570, mailed Jun. 1, 2011.

Red Hat Office Action for U.S. Appl. No. 11/897,570, mailed Oct. 24, 2011.

Abstraction Layer as of Aug. 2, 2007 http://en.wikipedia.org/w/index.php?title=Abstraction_layer&oldid=148731044.

IBM Corp., WebSphere MQ Version 6.0—"System Administration Guide", Feb. 15, 2005.

IBM Corp., "iSeries WebSphere Application Server—Express Version 5.1", May 13, 2003.

Altentee, "Monitoring Queue Statistics in MQ," Apr. 30, 2007, altentee.com/blogs/2007/monitoring-queue-statistics-in-mq/.

Various Authors, "MQSeries.net:: View Topic—How can you keeping running total msgs per Queue for the day?," Aug. 26, 2005, www.mqseries.net/phpBB2/viewtopic.php?t=24005.

USPTO; Office Action for U.S. Appl. No. 11/900,707, mailed Apr. 25, 2012.

USPTO; Office Action for U.S. Appl. No. 11/900,740, mailed Mar. 1, 2012.

USPTO; Office Action for U.S. Appl. No. 11/900,707, mailed Nov. 7, 2012.

USPTO; Office Action for U.S. Appl. No. 11/900,740, mailed Oct. 2, 2009.

USPTO; Office Action for U.S. Appl. No. 11/900,740, mailed Mar. 24, 2010.

USPTO; Office Action for U.S. Appl. No. 11/900,740, mailed Sep. 21, 2010.

USPTO; Office Action for U.S. Appl. No. 11/900,740, mailed Oct. 25, 2012.

USPTO; Office Action for U.S. Appl. No. 11/897,570, mailed Sep. 28, 2012.

* cited by examiner

METHOD AND APPARATUS FOR SUPPORTING MULTIPLE BUSINESS PROCESS LANGUAGES IN BPM

TECHNICAL FIELD

Embodiments of the present invention relate to business process management (BPM), and more specifically to supporting multiple business process languages in BPM.

BACKGROUND

Business process management (BPM) offers a programmatic structure for designing transactions and executing them using automated decisions, tasks and sequence flows. For example, an insurance company can use BPM to automate the steps involved in processing insurance claims. BPM solutions typically include an engine that executes process definitions, and tools that aid process development and monitoring.

A typical BPM engine supports a specific business process language. For example, jBPM, an engine used by jBoss division of Red Hat Inc., supports jBoss process definition language (jPDL). jPDL is a Java-centric workflow management language intended for business processes coordinating Java components. However, some business processes involve frequent interactions with heterogeneneous systems that are not limited to Java implementations. For such business processes, jPDL may not be an appropriate language.

Conventional BPM engines are tied to a single business process language and do not provide a flexibility of switching between different business process languages depending on the nature of business processes being modeled.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
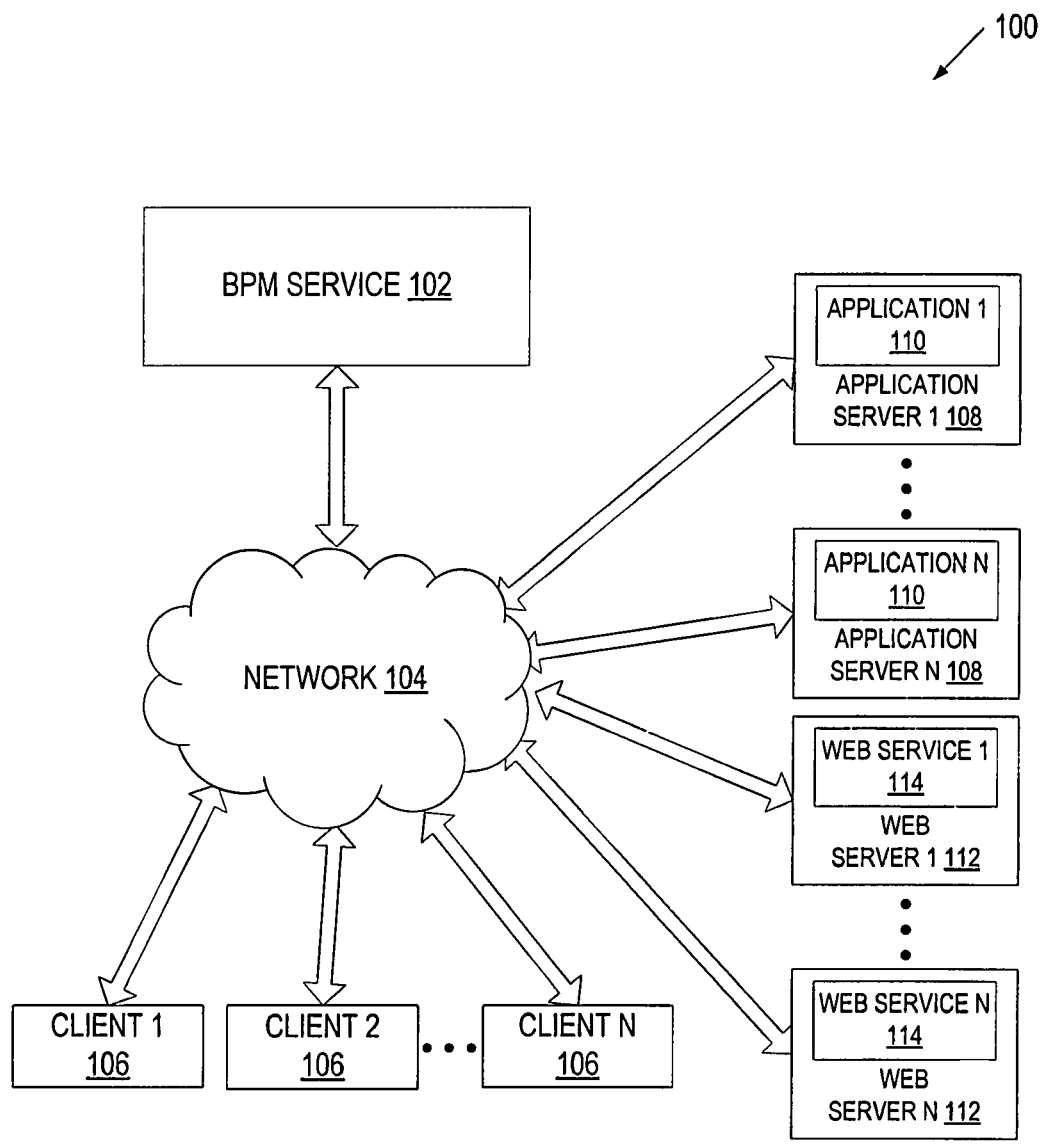
FIG. 1 illustrates an exemplary network architecture in which embodiments of the invention may operate.

Described herein is a method and apparatus for supporting multiple business process languages in business process management (BPM). In one embodiment, when a BPM process engine receives user input identifying a definition of a business process, it determines the business process language used for the definition of the business process, and invokes a runtime environment associated with this business process language. The BPM process engine then executes the business process in the invoked runtime environment.

The BPM process engine supports multiple business process languages including, for example, jBoss process definition language (jPDL) and business process execution language (BPEL). jPDL is intended for Java-centric workflow management, and BPEL is intended for web service-centric orchestration. Depending on the nature of the business process being modeled, a developer may choose to use jPDL or BPEL to define it. The BPM process engine can then execute the definition of the business process and provide tools for monitoring and analyzing the execution of the business process.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate.

The network architecture 100 may include client devices (clients) 106, a BPM system 102 and a network 104. The clients 102 may be, for example, personal computers (PCs), mobile phones, palm-sized computing devices, personal digital assistants (PDAs), etc.

The clients 106 are coupled to the BPM system 102 via the network 104, which may be a public network (e.g., Internet) or a private network (e.g., Ethernet or a local area Network (LAN)). The BPM system 102 may include one or more servers providing BPM functionality. In particular, the BMP system 102 may allow process developers to define business processes using different business process languages (e.g., jPDL, BPEL, etc.). Clients 106 may host browser applications to present user interfaces for defining business processes to their users. The BPM system 102 may execute business process definitions using a runtime environment corresponding to the business process language of the relevant business process definition. User interfaces may be provided to allow users of clients 106 to interact with execution of business processes, monitor the execution of business processes, and view statistics about business process executions. Users of clients 106 may include, for example, process developers, system administrators, business analysts, etc.

The network architecture 100 may also include application servers 108 hosting applications 110, and/or web servers 112 hosting web services 112. During execution, business processes may interact with applications 110 and/or web services 114 by invoking applications 110 and/or web services 114 or exchanging data with applications 110 and/or web services 114.

Figure 2A:
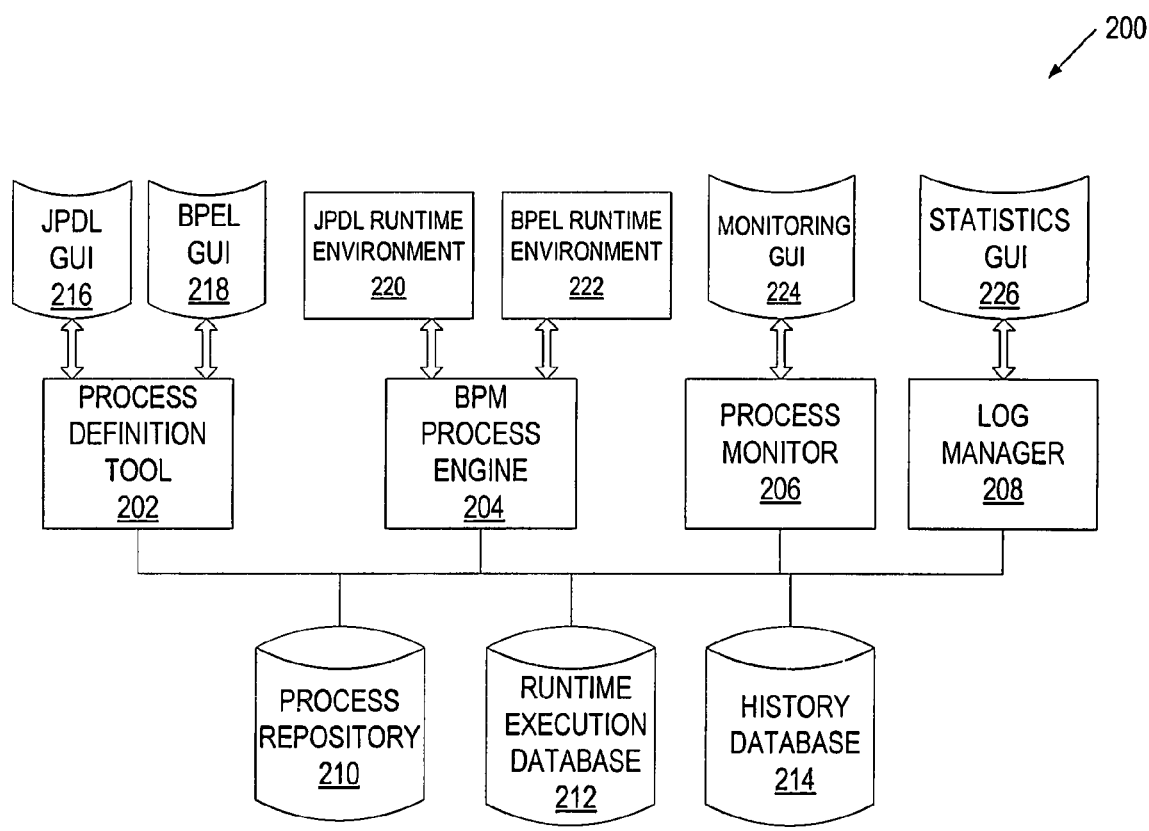
FIG. 2A illustrates a block diagram of one embodiment of a BPM system.

FIG. 2A is a block diagram of one embodiment of a BPM system 200. The BPM system 200 may include a process definition tool 202, a BPM process engine 204, a process monitor 206, a log manager 208, and data stores 210, 212 and 214.

The process definition tool 202 allows users (e.g., process developers) to define business processes using different business process languages. In particular, the process definition tool 202 may provide a user interface that facilitates user selection of a language for a definition of a business process. Upon receiving such a selection, the process definition tool 202 may present a graphical user interface (GUI) associated with the selected language. For example, the process definition tool 202 may present a jPDL GUI 216 or a BPEL GUI 218 when the user selects jPDL or BPEL respectively. Exemplary jPDL GUI and BEPL GUI will be discussed in more detail below in conjunction with FIGS. 2B and 2C. When the user provides a definition of a business process via the GUI, the process definition tool 202 stores the definition of the business process in a process repository 210.

The BPM process engine 204 is responsible for executing business processes. In one embodiment, the BPM process engine 204 receives a user request identifying a definition of a specific business process, and determines the business process language used for the definition. The definition of the business process may be stored in the process repository 210 or be downloaded from an external repository using a link provided by the user. The business process engine 204 may determine the language used for the process definition based on, for example, the filename extension of the file containing the process definition, or an indicator associated with the process definition in the process repository 210.

Once the BPM process engine 204 determines the business process language, it invokes a runtime environment associated with this language and executes the business process in the runtime environment. For example, depending on the language used for the process definition, the BPM process engine 204 may invoke a jPDL runtime environment 220 or a BPEL runtime environment 222. The jPDL runtime environment 220 may consist of a collection of libraries including, for example, a job executor plugin to monitor and enact work items produced by the business process, and an identity module to describe the organization where the business process occurs in terms of users as members of groups. The BPEL runtime environment 222 may consist of a collection of libraries including, for example, a web service handler to intercept incoming messages and dispatch them to the appropriate business process instance, a toolset to automatically generate the WSDL binding and service elements and the J2EE (Java Platform Enterprise Edition) deployment descriptors required to enact the business process and a family of adapters to allow the runtime environment to integrate seamlessly with any application server compatible with J2EE.

The BPM process engine 204 may provide a GUI allowing a user (e.g., a system administrator) to interact with runtime tasks generated by the process execution. This GUI may be uniform for all business processes, regardless of business process languages used for process definitions. Alternatively, the programming interfaces used to interact with the business process vary from one language to another. For example, jPDL processes may be accessed through the Java API defined specifically for jPDL processes, and BPEL processes may be accessed via a Web service interface defined for BPEL processes. An exemplary GUI for interacting with runtime tasks will be discussed in more detail below in conjunction with FIG. 2D. The BPM process engine 204 stores runtime execution data in a runtime execution database 212

The process monitor 206 and the log manager 208 may be part of a web console application or be other applications or modules. The process monitor 206 accesses the runtime execution database 212 and presents real-time data on runtime process instances to the user (e.g., a system administrator). The process monitor 206 maintains several categories of trace data. Some categories may be generic and may apply to all supported languages. For example, starting a process instance, entering a node, taking a transition and updating a variable are categories populated for either jPDL or BPEL. When displaying data in these categories, the process monitor 206 may be agnostic to process languages. On the other hand, a number of categories may be intrinsically bound to a specific language. For example, the swimlane, a construct that groups tasks assigned to the same actor, exists only in jPDL, and therefore the swimline category is only populated during execution of jPDL processes. Likewise, partner links are elements specific to BPEL, and there fore the partner link category is only populated during execution of BPEL processes. The process monitor 206 may show additional data on runtime process instances based on its awareness of the process language. The process monitor 206 may present this data via a monitoring GUI 224.

The log manager 208 evaluates runtime data once the execution of the business process is completed, compiles statistical data, and stores it in a history database 214. The log manager 208 may also provide a statistics GUI 226 to present statistics about process executions to users (e.g., managers) who may evaluate this information to find bottlenecks or other kinds of optimizations. In one embodiment, the statistics GUI 226 is uniform for all business processes, regardless of business process languages used for process definitions.

Accordingly, the BPM system 200 allows a user to select a language for defining the business process. For example, if the business process coordinates a set of Java components, the user can choose jPDL for this business process. Alternatively, if the business process orchestrates non-Java services (or a combination of Java and non-Java services), the user may choose BPEL for defining such a business process. Further, the BPM system 200 can execute business processes defined in different languages and provide uniform GUIs for monitoring and analyzing executions of processes defined in different languages. Hence, the user can utilize a single BPM system (e.g., a single software package installation) for all business processes, regardless of languages used for their definitions.

Figure 2B:
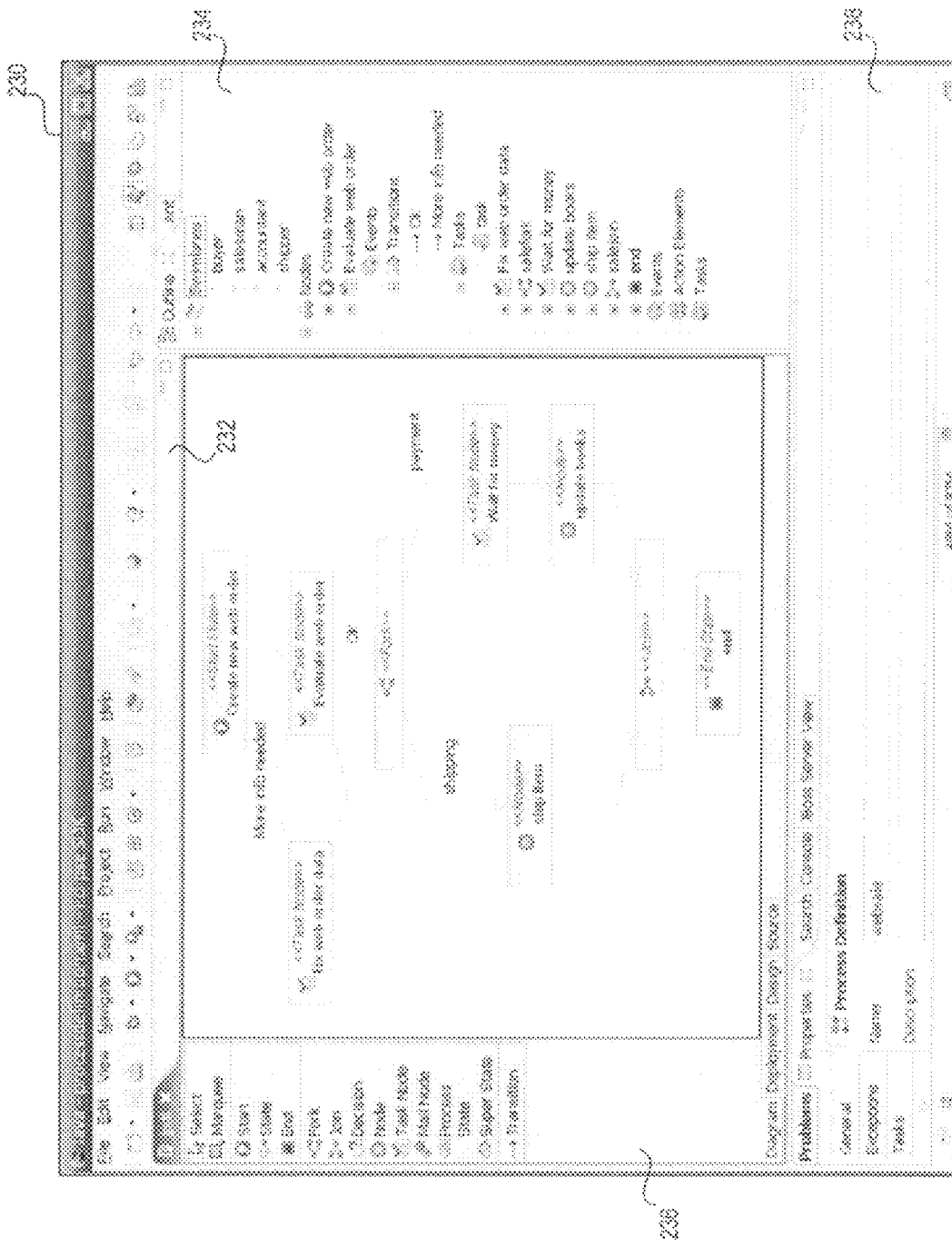
FIGS. 2B-2E illustrate exemplary user interfaces provided by a BPM system in accordance with some embodiments of the invention.
Figure 2C:
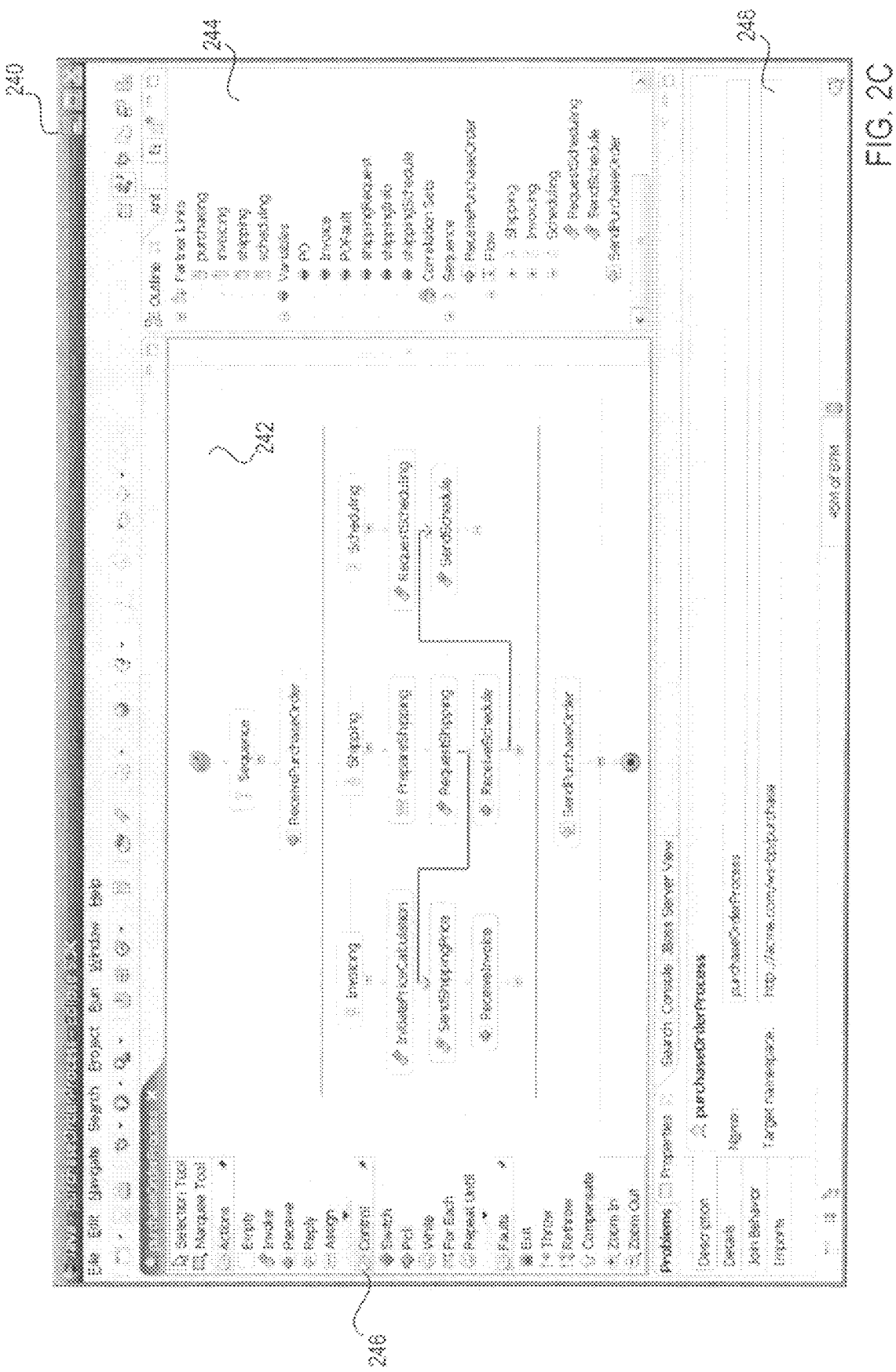
Figure 2D:
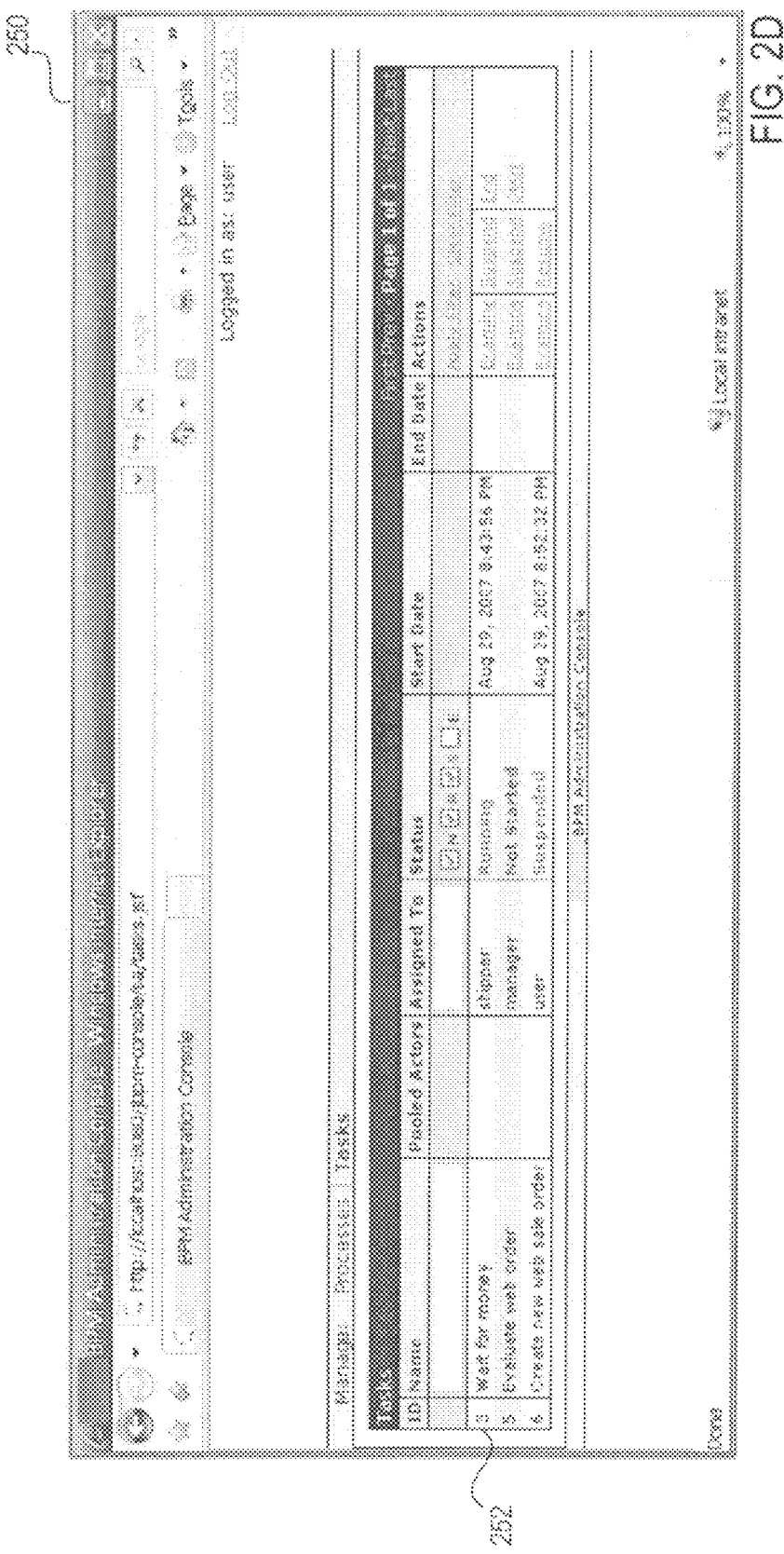
Figure 2E:
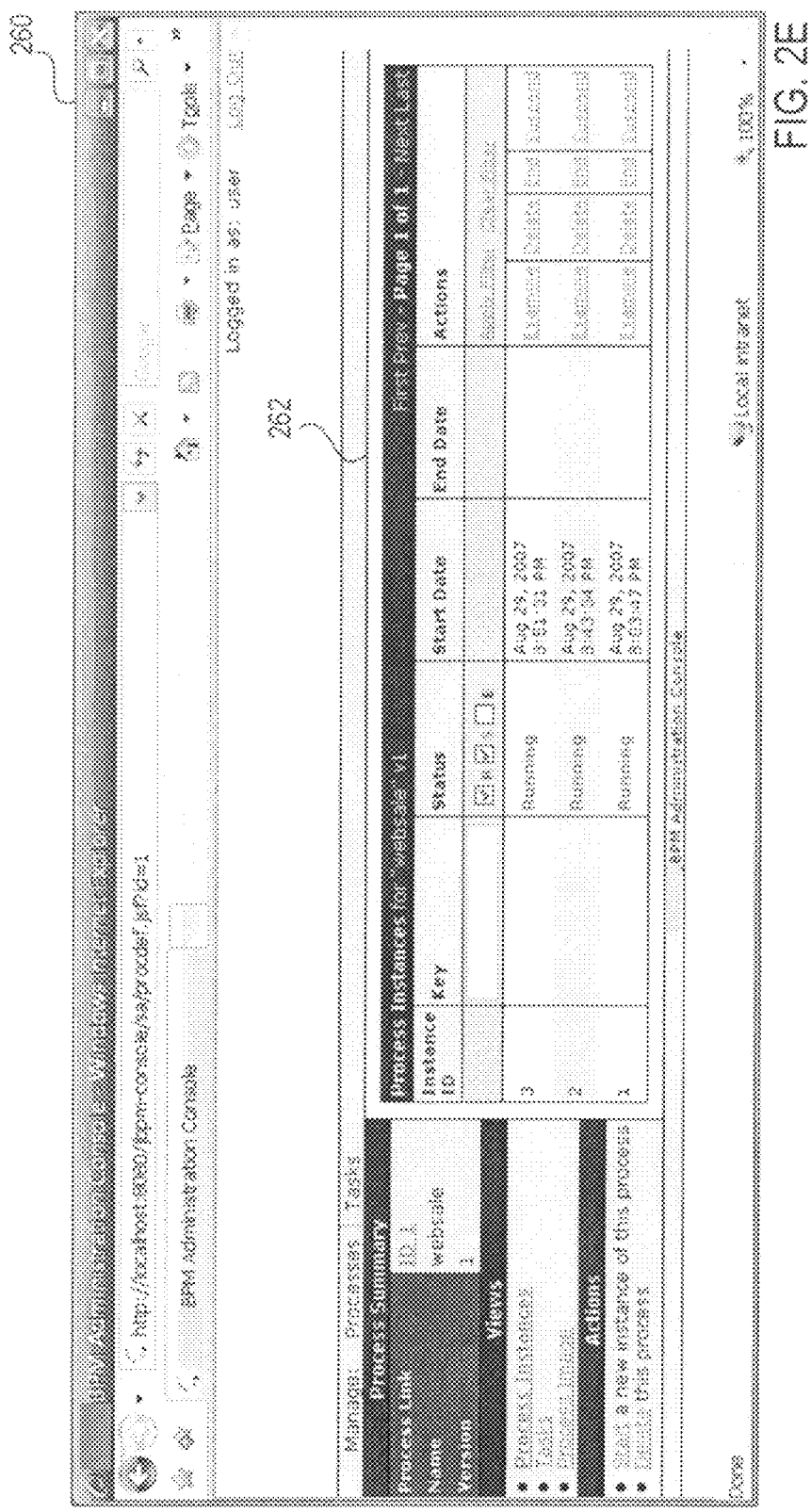

FIGS. 2B-2D illustrate exemplary GUIs provided by the BPM system 200 in accordance with some embodiments of the invention. Referring to FIG. 2B, GUI 230 allows process designers to define jPDL processes. GUI 230 includes a window 232 that presents a graphical representation of a jPDL process. Panes 236 and 234 provide means for defining the jPDL process, and pane 238 presents general information about the jPDL process.

Referring to FIG. 2C, GUI 240 allows process designers to define BPEL processes. GUI 240 includes a window 242 that presents a graphical representation of a BPEL process. Panes 246 and 244 provide means for defining the BPEL process, and pane 248 presents general information about the BPEL process.

Referring to FIG. 2D, GUI 250 allows users to interact with runtime tasks. GUI 250 includes a table 252 that lists tasks within a process instance, provides their status and specifies actions that can be taken on specific tasks upon a user request.

Figure 3:
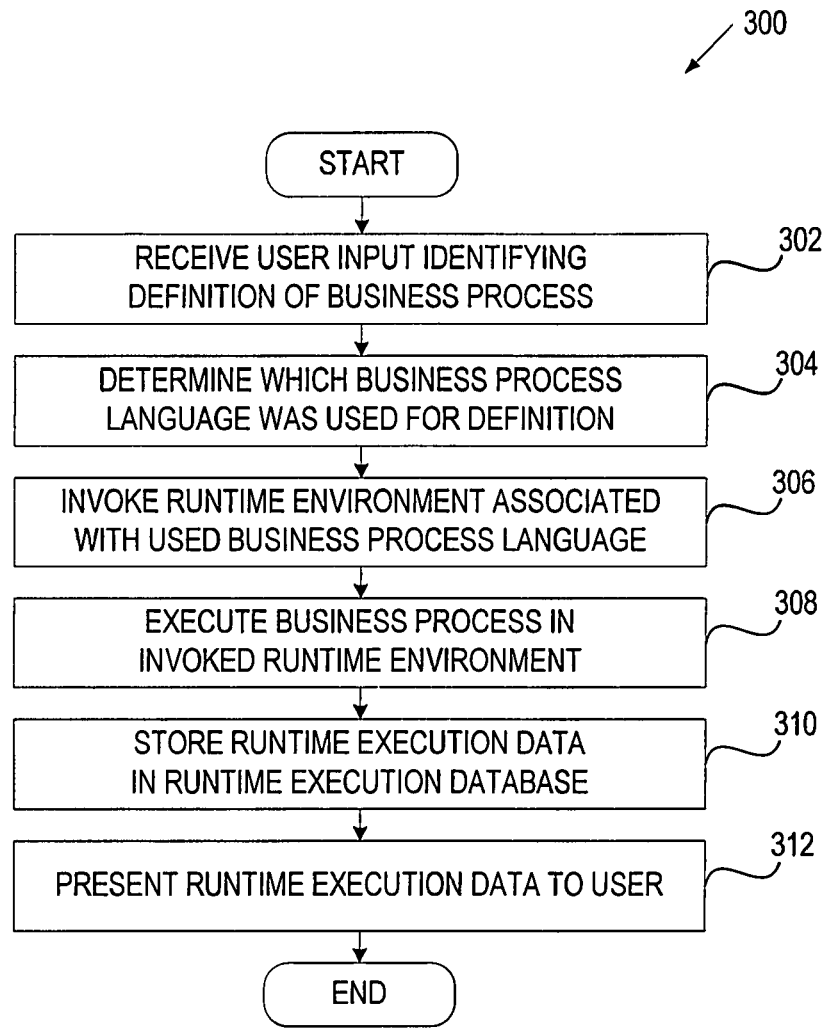
FIG. 3 illustrates a flow diagram of one embodiment of a method for providing support to multiple business process languages in BPM.

FIG. 3 illustrates a flow diagram of one embodiment of a method 300 for providing support to multiple business process languages in BPM. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Referring to FIG. 3, method 300 begins with processing logic receiving user input identifying a definition of a business process (block 302). The user input may be received when the user selects a business process from a list of business processes presented by processing logic (block 302). Alternatively, the user input may specify the name of the file containing the process definition, or a link (e.g., a URL) to the file containing the process definition.

At block 304, processing logic determines the business process language used for the process definition. The business process language may be, for example, a Java-centric workflow management language (e.g., jPDL) or a web service-centric orchestration language (e.g., BPEL). Processing logic may determine the language used for the process definition based on, for example, the filename extension of the file containing the process definition, or an indicator associated with the process definition stored in a process repository.

At block 306, processing logic invokes the runtime environment associated with the business process language (e.g., jPDL runtime environment or BPEL runtime environment). At block 308, processing logic executes the business process in the invoked runtime environment. During the execution, processing logic stores runtime execution data in a runtime execution database (block 310).

At block 312, processing logic presents runtime execution data to a user. In particular, processing logic may present a process execution user interface to allow a user to interact with the execution of the business process. In addition, processing logic may present a process monitoring user interface to allow a user to monitor the execution of the business process, and a statistics user interface to allow a user to view statistics about process executions. In one embodiment, the above user interfaces are uniform for all business processes, regardless of languages used for their definitions.

Figure 4:
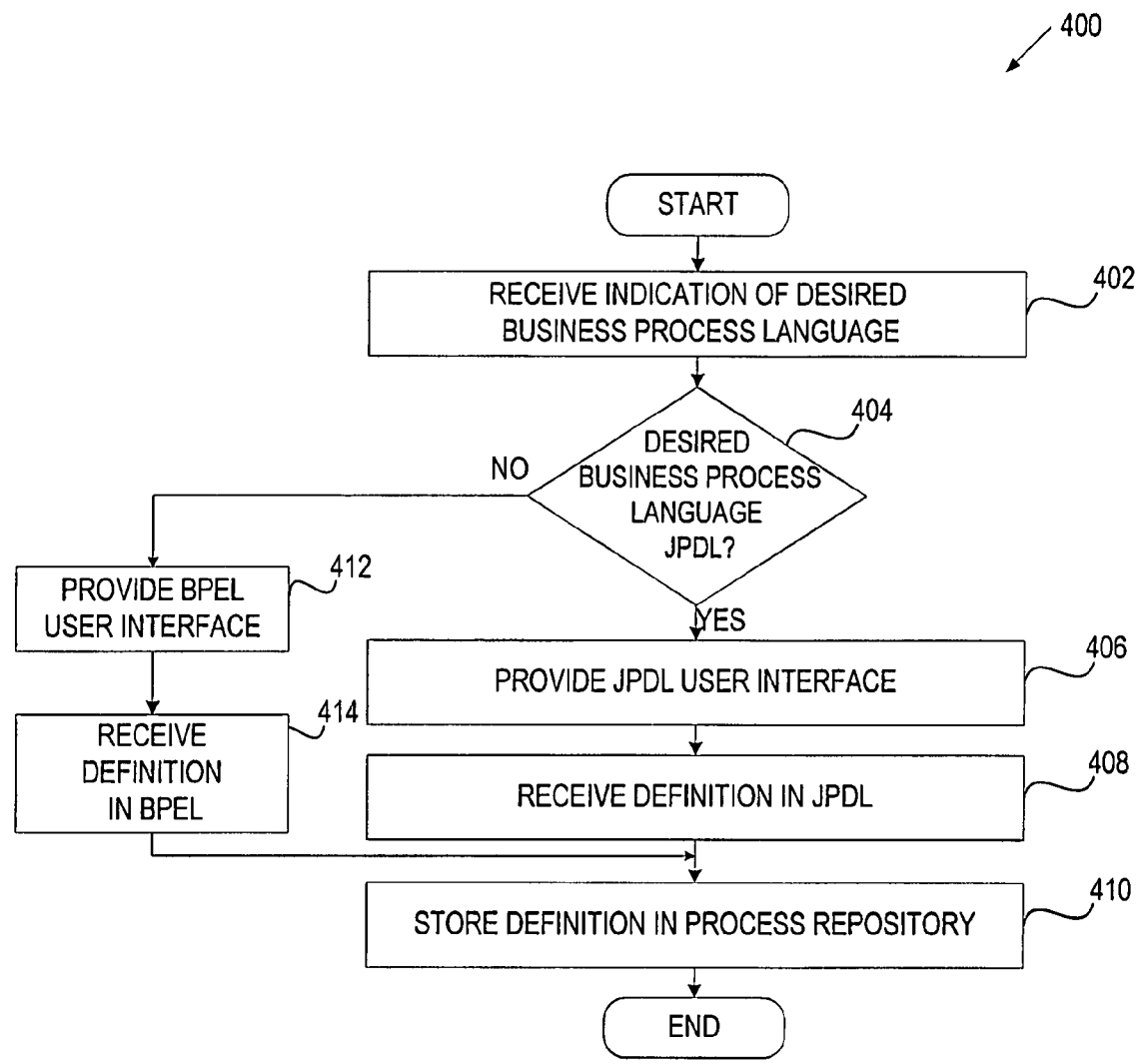
FIG. 4 illustrates a flow diagram of one embodiment of a method for receiving definitions of business processes.

FIG. 4 illustrates a flow diagram of one embodiment of a method 400 for receiving business process definitions. The method may be performed by processing logic that may comprise hardware (e.g., circuitry, dedicated logic, programmable logic, microcode, etc.), software (such as instructions run on a processing device), or a combination thereof. In one embodiment, method 400 is performed by process definition tool 202 of FIG. 2.

Referring to FIG. 4, method 400 begins with processing logic receiving an indication of a desired business process language (block 402). For example, the user may select a desired language from a list displayed on the screen, or activate a button associated with the desired language, or provide some other indication.

At block 404, processing logic determines whether the desired business process language is jPDL. If so, processing logic provides a jPDL GUI (block 406), receives the process definition via the jPDL GUI (block 408) and stores the process definition in a process repository (block 410).

If processing logic determines that the desired language is BPEL (block 404), processing logic provides a BPEL GUI (block 412), receives the process definition via the BPEL GUI (block 414) and stores the process definition in the process repository (block 410).

Figure 5:
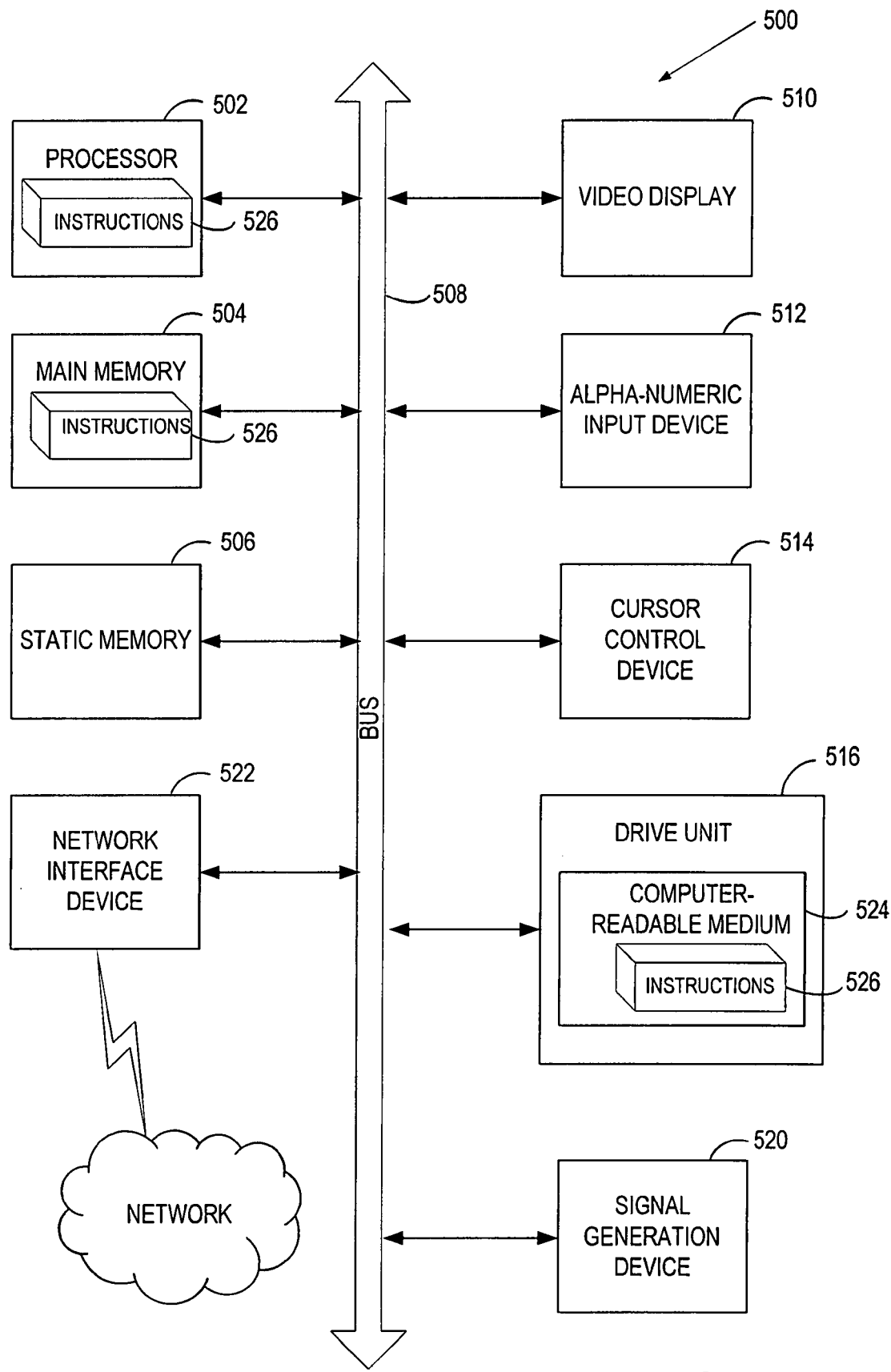
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   receiving, by a business process management (BPM) engine executable by a processing device to support a plurality of business process languages, user input identifying a definition of a business process;
   identifying one of the plurality of business process languages supported by the BPM engine and used for the definition of the business process, the identifying in view of a filename extension of a file containing the definition;
   invoking a runtime environment associated with the one of the plurality of business process languages;
   executing the business process in the invoked runtime environment; and
   storing, in a runtime execution database, runtime execution data collected during the executing of the business process, wherein the runtime execution data comprises generic data that applies across the plurality of business process languages and data specific to one of the plurality of business process languages.

2. The method of claim 1 wherein the plurality of business process languages comprises jPDL and BPEL.

3. The method of claim 2 further comprising:
   receiving an indication of a desired business process language;
   providing a first user interface if the desired business process language is jPDL;
   providing a second user interface if the desired business process language is BPEL; and
   storing the definition of the business process specified via the first or second user interface in a process repository.

4. The method of claim 1 further comprising:
   presenting the runtime execution data to a user.

5. The method of claim 4 wherein presenting the runtime execution data to the user comprises providing a monitoring user interface to allow the user to monitor the execution of the business process.

6. The method of claim 4 wherein presenting the runtime execution data to the user comprises providing an execution user interface to allow the user to interact with the execution of the business process.

7. The method of claim 4 wherein presenting the runtime execution data to the user comprises providing a statistics user interface to allow the user to view statistics associated with the execution of the business process.

8. The method of claim 4 wherein the runtime execution data is presented to the user in a uniform manner regardless of a business process language used for defining the business process.

9. A system comprising:
   a process repository to store definitions of a plurality of business processes; and
   a business process management (BPM) process engine, coupled to the process repository, the BPM process engine to support a plurality of business process languages, and to receive user input identifying a definition of one of the plurality of business processes, to identify one of the plurality of business process languages supported by the BPM process engine and used for the definition of the business process, the identifying in view of a filename extension of a file containing the definition, to invoke a runtime environment associated with the one of the plurality of business process languages, to execute the business process in the invoked runtime environment, and to store, in a runtime execution database, runtime execution data collected during executing of the business process, wherein the runtime execution data comprises generic data that applies across the plurality of business process languages and data specific to one of the plurality of business process languages.

10. The system of claim 9 wherein the plurality of business process languages comprises jPDL and BPEL.

11. The system of claim 9 further comprising:
    a process definition tool to receive an indication of a desired business process language, to provide a first user interface if the desired business process language is jPDL, to provide a second user interface if the desired business process language is BPEL, and to store the definition of the business process specified via the first or second user interface in the process repository.

12. The system of claim 9 further comprising:
    a web console to present the runtime execution data to a user.

13. The system of claim 12 wherein the web console is to provide a monitoring user interface to allow the user to monitor the execution of the business process.

14. The system of claim 12 wherein the web console is to provide an execution user interface to allow the user to interact with the execution of the business process.

15. The system of claim 12 wherein the web console is to provide a statistics user interface to allow the user to view statistics associated with the execution of the business process.

16. The system of claim 12 wherein the web console is to provide the runtime execution data to the user in a uniform manner regardless of a business process language used for defining the business process.

17. A non-transitory machine-accessible storage medium including data that, when accessed by a processing device, cause the processing device to perform a method comprising:

receiving, by a business process management (BPM) engine to support a plurality of business process languages, user input identifying a definition of a business process;

identifying, by the processing device, one of the plurality of business process languages supported by the BPM engine and used for the definition of the business process, the identifying in view of a filename extension of a file containing the definition;

invoking a runtime environment associated with the one of the plurality of business process languages;

executing the business process in the invoked runtime environment; and storing, in a runtime execution database, runtime execution data collected during the executing of the business process, wherein the runtime execution data comprises generic data that applies across the plurality of business process languages and data specific to one of the plurality of business process languages.

18. The non-transitory machine-accessible storage medium of claim 17 wherein the method further comprises:
presenting the runtime execution data to a user.

19. The non-transitory machine-accessible storage medium of claim 18 wherein presenting the runtime execution data to the user comprises:

providing a monitoring user interface to allow the user to monitor the execution of the business process;

providing an execution user interface to allow the user to interact with the execution of the business process; and providing a statistics user interface to allow the user to view statistics associated with the execution of the business process.

20. The non-transitory machine-accessible storage medium of claim 17 wherein the runtime execution data is presented to the user in a uniform manner regardless of a business process language used for defining the business process.

* * * * *